(12) United States Patent
Rooney

(10) Patent No.: US 6,929,044 B1
(45) Date of Patent: Aug. 16, 2005

(54) ALL-TERRAIN VEHICLE TIRE

(75) Inventor: Timothy Michael Rooney, Munroe Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/130,620

(22) PCT Filed: Nov. 17, 1999

(86) PCT No.: PCT/US99/27323

§ 371 (c)(1),
(2), (4) Date: May 17, 2002

(87) PCT Pub. No.: WO01/36218

PCT Pub. Date: May 25, 2001

(51) Int. Cl.⁷ .................. B60C 11/11; B60C 11/13; B60C 107/00; B60C 121/00
(52) U.S. Cl. .................. 152/209.12; 152/209.22; 152/209.26; 152/209.28
(58) Field of Search ............... 152/209.12, 209.22, 152/209.26, 209.28

(56) References Cited

U.S. PATENT DOCUMENTS

| | | | |
|---|---|---|---|
| 3,939,890 A | | 2/1976 | Abe .................. 152/209 B |
| 4,881,586 A | * | 11/1989 | Shinomiya .......... 152/209.12 |
| 5,058,643 A | * | 10/1991 | Nakasaki ............ 152/209.16 |
| 5,259,429 A | | 11/1993 | Harms ................ 152/209 B |
| 5,375,640 A | * | 12/1994 | Harms ................ 152/209.12 |
| 5,411,067 A | | 5/1995 | Beeghly et al. ...... 152/209 B |
| 5,879,482 A | * | 3/1999 | Rooney et al. ....... 152/209.16 |
| 6,021,829 A | * | 2/2000 | Rooney .............. 152/209.12 |
| 6,189,586 B1 | * | 2/2001 | Guidry .............. 152/209.15 |
| 6,220,322 B1 | * | 4/2001 | Matsuura ............ 152/209.22 |
| 6,263,933 B1 | * | 7/2001 | Baus ................. 152/209.12 |
| 6,401,774 B1 | * | 6/2002 | Rooney .............. 152/209.12 |
| 6,530,404 B1 | * | 3/2003 | Rooney .............. 152/209.11 |
| 6,536,490 B2 | * | 3/2003 | Rooney .............. 152/209.12 |

FOREIGN PATENT DOCUMENTS

| | | | | |
|---|---|---|---|---|
| EP | 0318416 | | 5/1989 | .......... B60C 11/11 |
| FR | 2163396 | | 7/1973 | .......... B60C 11/00 |
| GB | 755137 | * | 8/1956 | |
| GB | 1591139 | * | 6/1981 | |
| JP | 5-155204 | * | 6/1993 | |
| WO | 9803356 | | 1/1998 | .......... B60C 11/11 |
| WO | 9952720 | | 10/1999 | .......... B60C 11/11 |

OTHER PUBLICATIONS

Patent Abstracts of Japan vol. 018, No. 055 (M-1550), Jan. 28, 1994 & JP 05 278415 A (Bridgestone Corp), Oct. 26, 1993 abstract.

* cited by examiner

*Primary Examiner*—Steven D. Maki
(74) *Attorney, Agent, or Firm*—June E. Rickey; David L. King

(57) ABSTRACT

An All Terrain Vehicle Tire (10) for the drive axle positions has a tread (12) having three circumferentially continuous channels (61 62, 63). Two of the channels (62, 63) divide the elongated lugs (40, 42) into an axially inner portion (40A, 42A) and an axially outer portion (40B, 42B). The channels (61, 62, 63) and soil discharge channels (60) between elongated lugs (40, 42) facilitate mud cleaning of the tread (12).

4 Claims, 6 Drawing Sheets

ALL-TERRAIN VEHICLE TIRE

TECHNICAL FIELD

This invention relates to off-the-road tires, more specifically, this invention relates to a pneumatic all-terrain vehicle tire.

BACKGROUND OF THE INVENTION

All-terrain vehicles are relatively lightweight with a relatively low center of gravity. Early three wheel versions had knobbly tires having small square block elements and a relatively shallow tread depth.

Later versions of "Quad runners" or 4-wheel type ATV's were developed and have been more widely accepted due to their improved stability. Horsepower increases and improvements in both vehicle suspension and chassis has resulted in vehicles capable of relatively high speed and much greater load carrying capacity.

The tires used on these vehicles are operated at very low pressures in the 0.7 bar (10 psi) or less range. The tires are very wide with relatively large air chambers which assist in absorbing shock and vibration. The tires generally have nominal rim diameters of 36 cm (14 inches) or less and overall diameters of 69 cm (27 inches) or less.

Often the rear tires are of a slightly larger size than the more lightly loaded front tires.

In aggressive off-the-road applications, the tires must have a very open tread pattern that employs elongated lugs which provide effective straightline or drawbar traction to enable the vehicle to climb hilly and rough terrain, as shown in U.S. Design Pat. No. 308,038. Additionally, the tread must provide excellent lateral traction for vehicle stability during turning maneuvers as is disclosed in U.S. Pat. No. 5,259,429.

The tire disclosed in that patent employs a repeating pattern of long, intermediate length and short lugs arranged to provide improved traction. The arrangement of these lugs is such that each lug wraps completely over the tread shoulder portion. The lugs are also circumferentially relatively closely spaced such that numerous lugs are in the footprint of the tire at any one time. The tire made according to this prior art invention is considered one of the best mud tires in its class according to its manufacturer.

In wet soils with heavy clay content there is a tendency for the tread to pack with mud between the elongated lugs. The circumferential space between the adjacent lugs is commonly referred to as a soil discharge channel. The channels extend generally from the centerplane of the tread axially outwardly over the tread shoulder. Once this area is packed with mud, the tread effectively looses its ability to provide any traction. This is because the lugs are buried in the packed mud giving the tire the appearance of a slick or racing tread devoid of grooves.

An objective of the present invention is to provide a tread pattern which is self-cleaning in wet clay soil conditions.

It is a further object that the tread design have good handling and traction performance on firm soils.

SUMMARY OF THE INVENTION

An all-terrain vehicle tire (10) for the drive axle position of an ATV vehicle is disclosed. The tire (10) has a carcass (30) and a tread (12) radially outward of the carcass (30).

The tread (12) has a plurality of elongated lugs (40,42) extending radially outwardly from an inner tread (13) and being located between a first and second lateral tread edges (14,16). The distance between the lateral tread edges (14,16) defines the tread arc width (TW). The distance halfway between the lateral tread edges (14,16) defines the centerplane (EP) of the tread (12).

The elongated lugs (40,42) are arranged in rows (1,2) around the circumference of the tread (12). A first row (1) of elongated lugs (40) extends from an axially inner end (41) adjacent the centerplane (EP) of the tread toward a first lateral edge terminating at an axially outer end (49). A second row of elongated tread lugs extends from an axially inner end adjacent the centerplane of the tread toward the second lateral tread edge terminating at an axially outer end (49) preferably the second row of tread lugs are circumferentially offset relative to the first row.

The tread has three or more circumferentially continuous open channels (61,62,63). A first circumferentially continuous open channel (61) is located between the axially inner ends (41) of the first and second rows (1,2) of elongated lugs (40,42). A second circumferentially continuous open channel (62) is located between the first lateral tread edge (14) and the centerplane (EP) of the tread (12). The third circumferentially continuous open channel (63) is located between the second lateral tread edge (16) and the centerplane (EP) of the tread (12).

As used herein, the term circumferentially continuous open channel (61,62,63) means that at each channel there is an annular open space having minimum axial width of at least (S), (S) being preferably at least 1 cm, more preferably about 2 cm. Ideally each of the open channels have the minimum open spaces (S) intersected by a parallel plane A, B or C the parallel planes A, B, or C being parallel to the tread centerplane and perpendicular to the tires axis.

While the first circumferentially continuous open channel (61) is preferably centered on the centerplane (EP) of the tread (12), the second and third circumferentially continuous open channels (62,63) are at a distance less than 40% of the tread arc width (TW) from the centerplane, preferably in the range of 25% to 40% of the tread arc width from the centerplane of the tread, most preferable the second and third circumferentially continuous open channels (62,63) are centered at a location about 33% of the tread arc width TW from the centerplane of the tread (12).

The second circumferentially continuous open channel (62) pass through each elongated lug (40) of the first row forming an axially inner portion (40A) and an axially outer portion (40B) of the lug (40). Similarly, the third circumferentially continuous open channel (63) passes through each elongated lug (42) of the second row (2) forming an axially inner portion (42A) and an axially outer portion (42B) of the lug (42).

Preferably, the elongated tread lugs (40,42) have a radial depth D as measured from the radially outer surface to the inner tread 13.

A reduced depth tire bar connecting the axially inner portion (40A,42B) to the axially outer portion (40A,42B) of the elongated lugs (40,42) may be located in the second and third circumferentially continuous open channels. These tie bars preferably have a height (h), (h) being 50% or less of D as measured from the inner tread (13).

The all-terrain vehicle tire (10) of the present invention preferably has a net-to-gross ratio of the tread (12) as measured between the lateral edges (14,16) around the entire circumference of the tread of less than 35%.

Definitions "All-terrain Vehicle (ATV)" is any motorized off-highway vehicle 50 inches (1270 mm) or less in overall width, with an unladen dry weight of 600 lbs. (275 kg) or less, designed to travel on four or more low pressure tires, having a seat designed to be straddled by the operator and handlebars for steering control, and intended for use by a single operator and no passenger. Width and weight shall be exclusive of accessories and optional equipment. ATV's are subdivided into four categories as follows:

Category G (General Use Model) ATV: An ATV intended for general recreational and utility use;

Category S (Sport Model) ATV: An ATV intended for recreational use by experienced operators only;

Category U (Utility Model) ATV: An ATV intended primarily for utility use.

Category Y (Youth Model) ATV: An ATV intended for recreational off-road use under adult supervision by operators under age 16. Youth model ATV's can further be categorized as follows:

Category Y-6 ATV: A Category Y-6 ATV is a youth model ATV which is intended for use by children age 6 and older.

Category Y-12 ATV: A Category Y-12 ATV is a youth model ATV which is intended for use by children age 12 and older.

"Aspect Ratio" means the ratio of its section height to its section width.

"Axial" and "axially" means the lines or directions that are parallel to the axis of rotation of the tire.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Bias Ply Tire" means that the reinforcing cords in the carcass ply extend diagonally across the tire from bead-to-bead at about a 25–65° angle with respect to the equatorial plane of the tire, the ply cords running at opposite angles in alternate layers.

"Carcass" means a laminate of tire ply material and other fire components, excluding the tread and any belt reinforcements, these additional components may be added to the carcass prior to its being vulcanized to create the molded tire.

"Equatorial Plane (EP)" means the plane perpendicular to the tire's axis of rotation and passing through the center of its tread.

"Inner" means toward the inside of the tire and "outer" means toward its exterior.

"Outer" means toward the tire's exterior.

"Pneumatic tire" means a laminated mechanical device of generally toroidal shape (usually an open-torus) having beads and a tread and made of rubber, chemicals, fabric and steel or other materials. When mounted on the wheel of a motor vehicle, the tire through its tread provides traction and contains the fluid that sustains the vehicle load.

"Radial" and "radially" mean directions radially toward or away from the axis of rotation of the tire.

"Radial Ply Tire" means a belted or circumferentially-restricted pneumatic tire in which the ply cords which extend from bead to bead are laid at cord angles between 65° and 90° with respect to the equatorial plane of the tire.

"Section Height" (SH) means the radial distance from the nominal rim diameter to the outer diameter of the tire at its equatorial plane.

"Section Width" (SW) means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Sidewall" means that portion of a tire between the tread and the bead.

"Tread" means a molded rubber component which when, bonded to a tire casing, includes that portion of the tire that comes into contact with the road when the tire is normally inflated and under normal load.

"Tread Width or Tread Arc Width" means the arc length of the tread surface in the axial direction, that is, in a plane parallel to the axis of rotation of the tire.

DETAILED DESCRIPTION OF THE INVENTION

Figure 1:
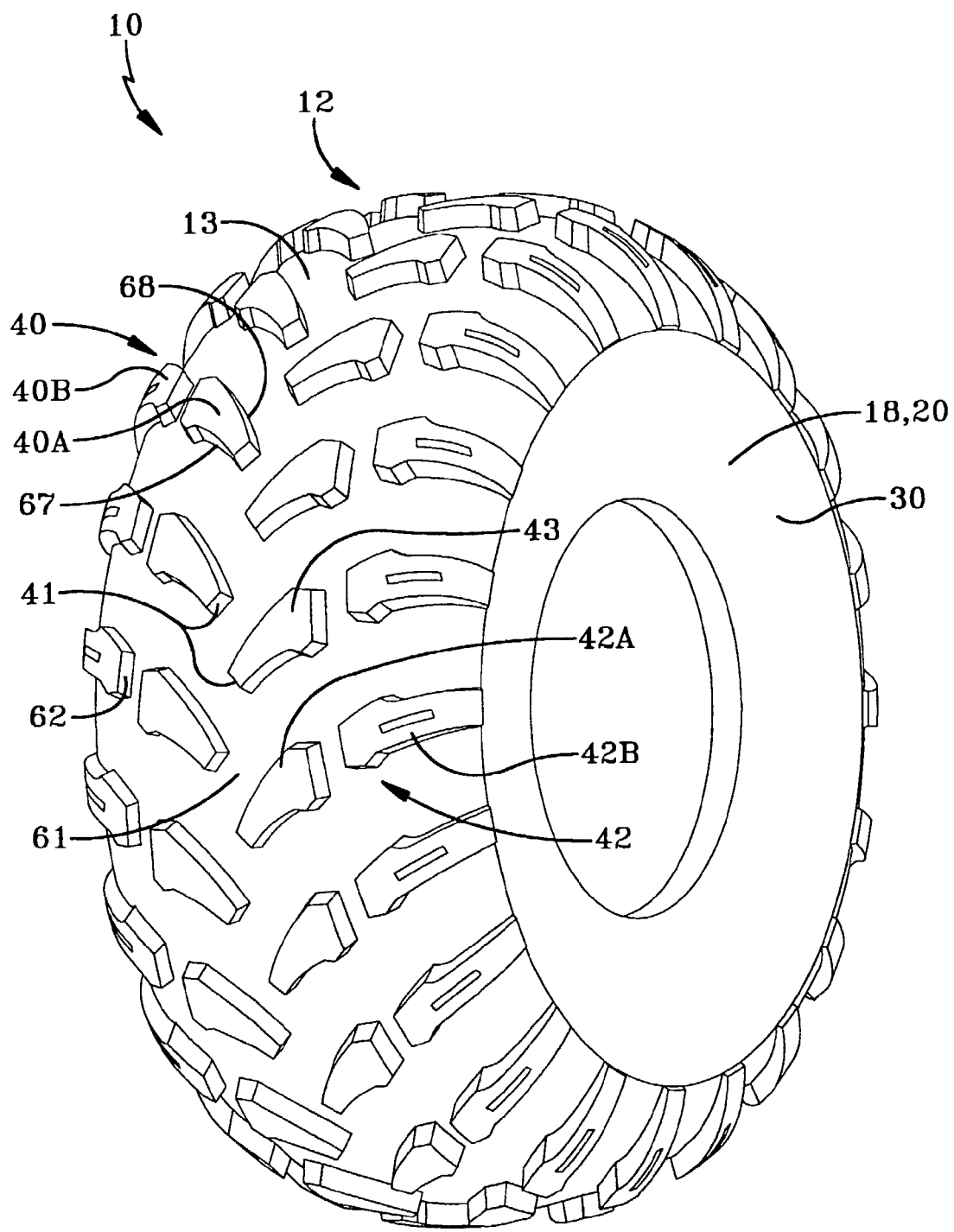
FIG. 1 is a perspective view of the preferred tire according to the invention.

With reference to FIG. 1 the preferred tire (10) according to the present invention is illustrated. The tire (10) has a nominal rim diameter of 36 cm (14 inches) or less; a carcass (30) a tread (12) disposed radially outward of the carcass.

The reference numerals as depicted in the drawings are the same as those referred to in the specification. For purposes of this application, the various embodiments illustrated in FIGS. 1–6 each use the same reference numerals for similar components.

The tread (12) has an inner tread (13) and a plurality of elongated lugs (40, 42) each lug (40,42) having an axially inner portion (40A,42A) and an axially outer portion (40B, 42B) extending radially outward of the inner tread (13).

Figure 3:
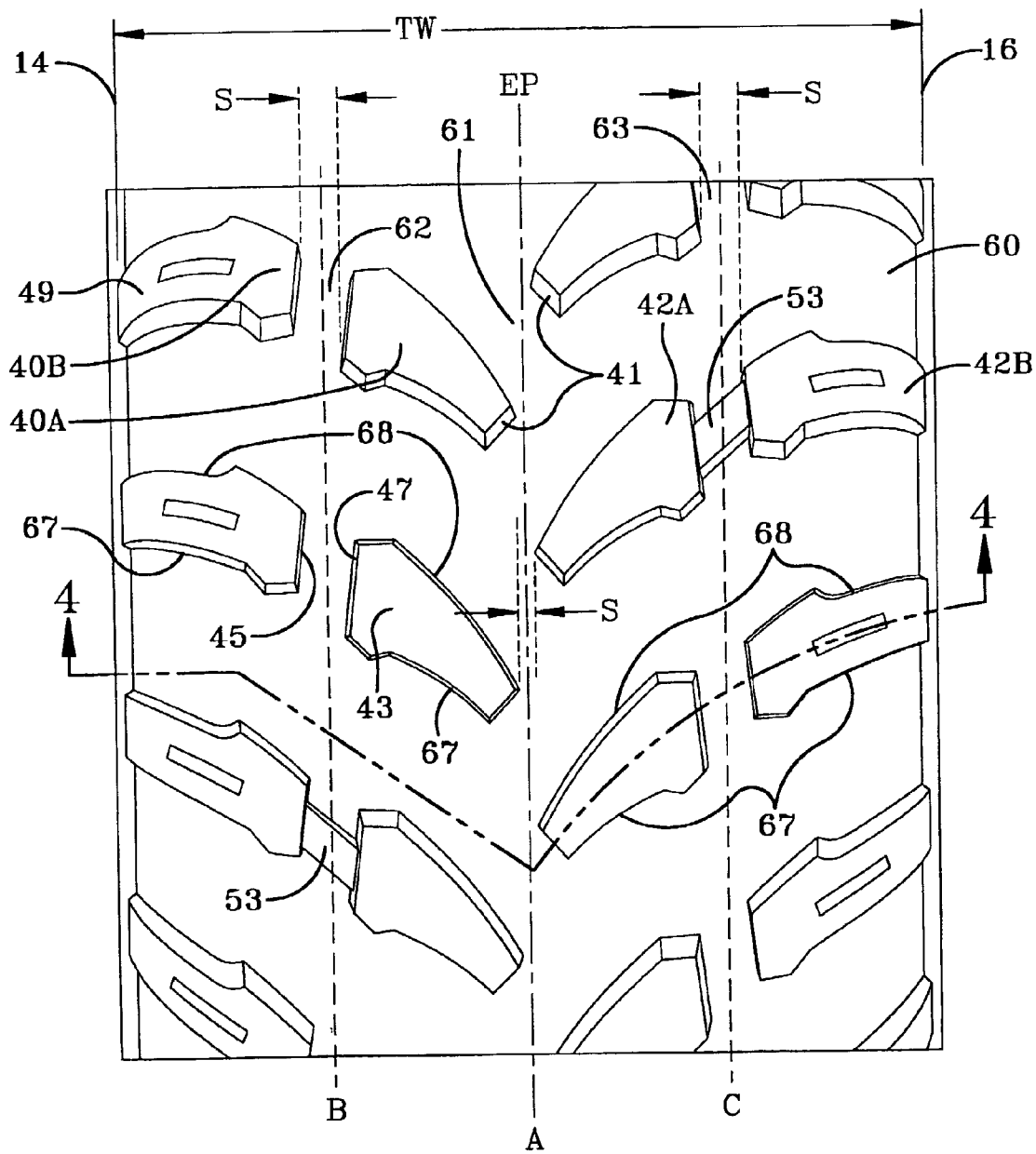
FIG. 3 is a cross-sectional view of the tire taken along lines 3—3 of FIG. 2.

Referring to FIG. 3, a cross-sectional view of the preferred tire (10) is shown.

The tire (10) according to the present invention is an ATV tire. The tire (10) is provided with a ground-engaging tread portion (12) which terminates in the shoulder portions at the lateral edges (14,16) of the tread (12). Sidewall portion (18,20) extends from tread lateral edges (14, 16) respectively and terminates in a pair of bead regions (22) each having an annular inextensible bead core (26) respectively. The tire (10) is further provided with a carcass (30) which has a reinforcing ply structure (38) which extends from bead region (22) through sidewall portion (18), tread portion (12), sidewall portion (20) to bead region (22). The turn-up ends (32,34) of ply structure (38) are preferably wrapped about bead cores (26) respectively. The tire (10) may include a conventional innerliner (35) forming the inner peripheral surface of the tire (10), if the tire is to be of the tubeless type. One pair of tread reinforcing belt or breaker structures (36) may optionally be placed circumferentially about the radially outer surface of reinforcing ply structure (38) beneath tread portion (12). In the particular embodiment illustrated, breaker structures (36) each comprises two cut breaker plies (50,51) and the cords of breaker plies (50,51) are oriented at an angle of about 35° with respect to the midcircumferential centerplane of the tire.

The cords of breaker ply (50) are disposed in an opposite direction to the midcircumferential centerplane and from that of the cords of breaker ply (51). However, the belt or breaker structures (36) if used in the ATV tire may comprise any number of belt or breaker plies of any desired configuration and the cords may be disposed at any desired angle. Belt or breaker structures (36) provide lateral stiffness across the belt width so as to help minimize lifting of the tread from the road surface during operation of the tire as well as providing puncture resistance. In the embodiment illustrated, this can be accomplished by making the cords of belt or breaker plies (50,51) of nylon or similar synthetic material.

It must be appreciated that the employment of a belt or breaker structure can have detrimental effects on ride and handling and, therefore, in many applications the use of such features may be undesirable for a particular ATV vehicle. Furthermore, these belt or breaker structures may be desirable on the front tires or the rear tires but not both the front and rear tires. One of ordinary skill in the tire art can easily appreciate when such components should be employed and when they should be avoided.

The tire illustrated in FIG. 3 shows the carcass (30) which has at least one reinforcing ply structure (38). The reinforcing ply structure (38) has at least one ply layer of cords (41) for a radial ply tire, the cords (41) being oriented at an angle in the range of 65° to 90° relative to the equatorial plane and the structure (38) for a bias tire has at least two ply layers of cords (41), the cords of each adjacent layer being equal but oppositely oriented at an angle of 25° to 65° with respect to the equatorial plane of the tire.

Figure 2:
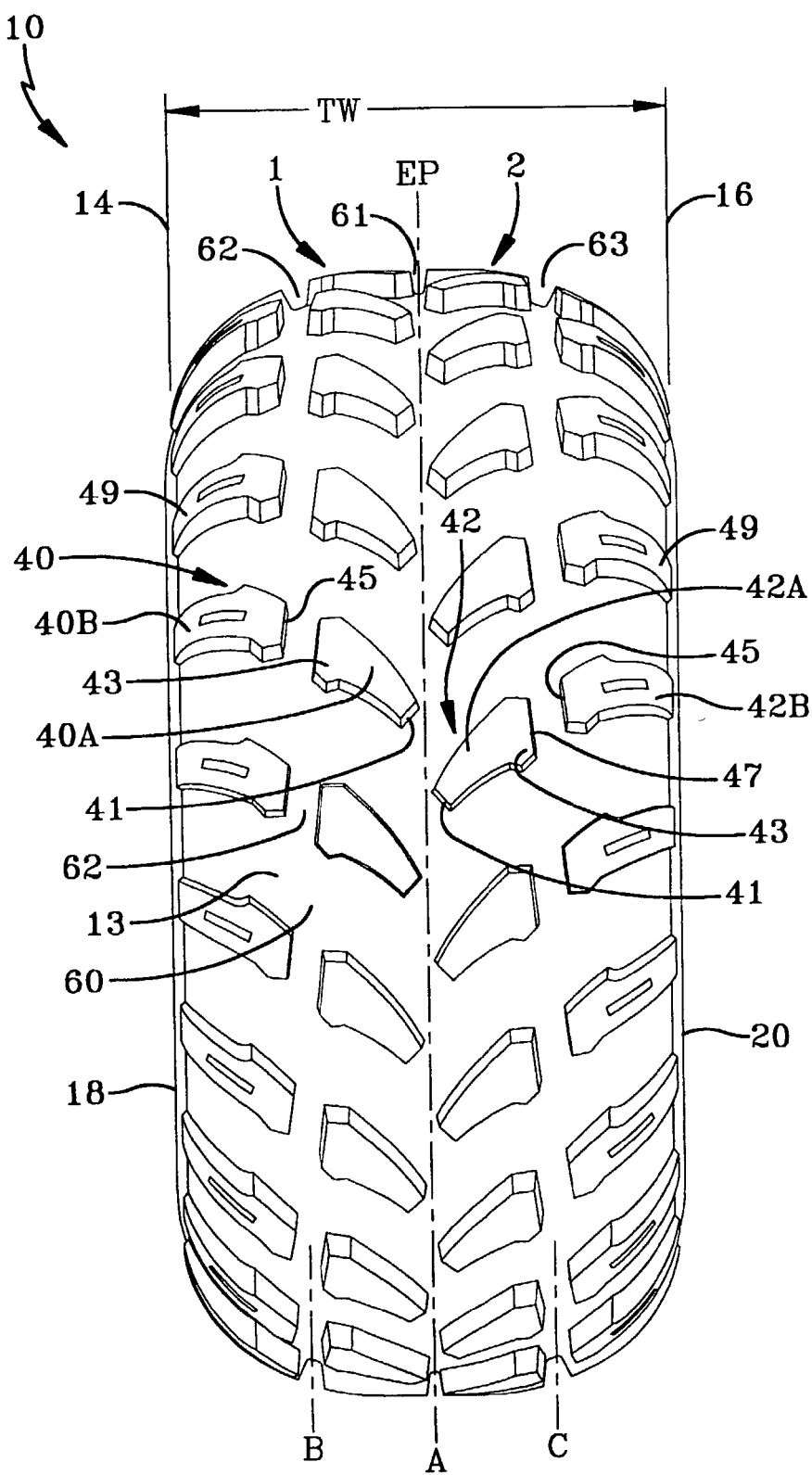
FIG. 2 is a plan view of the tire of FIG. 1.
Figure 4:
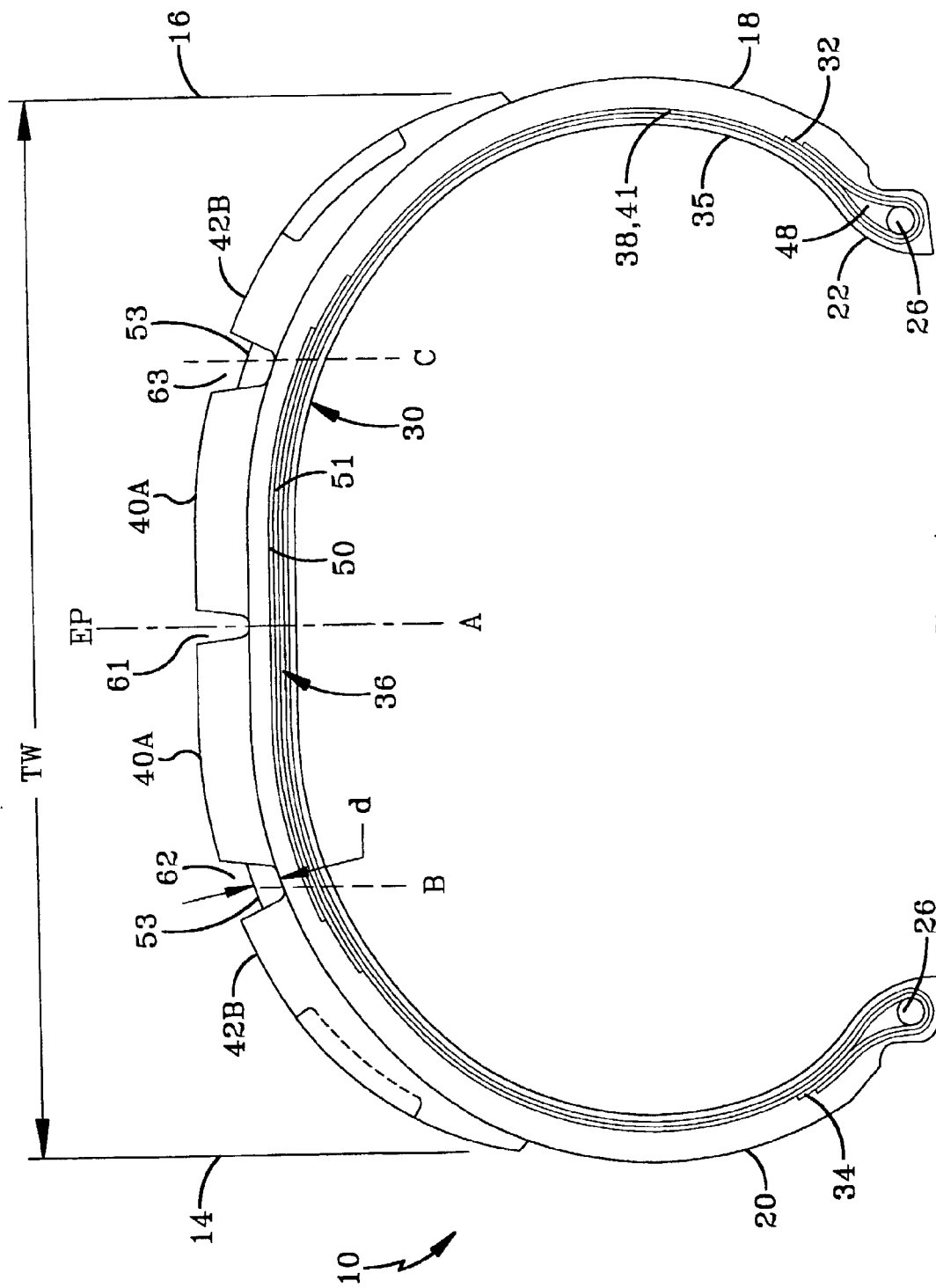
FIG. 4 is an enlarged fragmentary view of the tire of FIG. 1.

Referring to FIGS. 2 and 4, a plan view of the tire (10) and an enlarged fragmentary portion of the tread (12) is shown respectively.

The lateral edges (14,16) are defined as planes perpendicular to the tire axis of rotation R and intersecting the axially outermost portions of the elongated lugs 40,42 in the shoulder regions. The distance between the lateral edges defines the tread arc width and the tread width. The distance halfway between the lateral edges is the equatorial centerplane EP of the tire (10). The tread (12) has elongated lugs (40,42) extending radially outward from the inner tread (13). Each lug (40,42) has a leading edge (67) and a trailing edge (68). Preferably, the leading and trailing edges are curved.

The lugs (40,42) are arranged into two circumferentially repeating rows (1,2). The first and second rows (1,2) extends laterally outwardly from the center of the tread (12) to a respective tread lateral edge (14,16). The first row is circumferentially offset relative to the second row.

Figure 6:
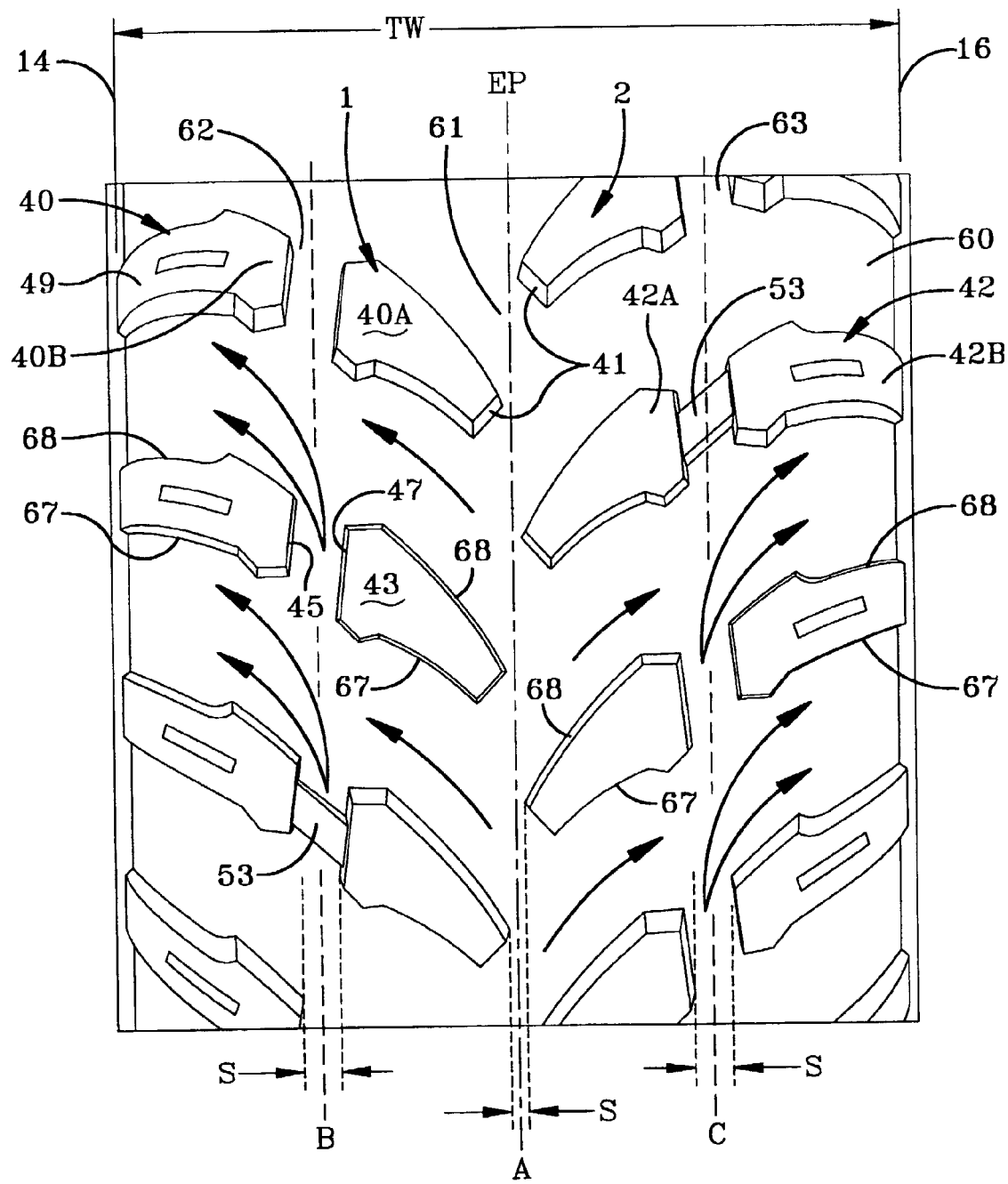
FIG. 6 is a soil discharge flow pattern of a footprint of the tire of FIG. 1.

As shown in FIG. 6, volumetric space above the inner tread (13) between the circumferentially adjacent lugs (40, 42) of the first and second (1,2) form soil discharge channels (60) extending from the central portion of the tread (13) axially outwardly to a tread shoulder. Each soil discharge channel (60) is opened to both circumferentially adjacent soil discharge channel (60) via a circumferentially continuous open channel at an axially inner location (61) at the tread centerplane, and is opened to both circumferentially adjacent soil discharge channels (60) via a circumferentially continuous open channel at an axially outer location (62). The channel at the axially inner location (61) and the channel at the axially outer location (62) as illustrated are aligned axially around the circumference of the tread. The minimal axial width of each channel at each axially inner location (61) and each axially outer location (62) is in the range of 1 cm to 4 cm, preferably about 2 cm. The opening at the axially inner location (61) is between an axially inner end of an elongated shoulder lug (40) and an axially inner end of an elongated lug (42). Whereas, the channels at the axially outer locations (62) is between an axially inner portion (40A,42A) and an axially outer portion (40B,42B) of each elongated lug (40,42). The channels minimum opening (S) at the axially inner location (61) is intersected by a circumferentially extending and parallel plane (A) between the lugs (40,42) and by a plane (B or C) between the axially outermost point of the axially inner portion (40A,42A) and at the axially innermost point of the axially outer portion (40B,42B) of the lugs (40,42).

Preferably each lug (40,42) of the first and second row (1,2) has an enlarged circumferentially extending lug head (43) located at an axially outer end (47) of the axially inner portions (40A,42A) lugs (40,42), more preferably the lug heads (43) of the rows (1,2) are respectively axially aligned and spaced from the equatorial plane. Preferably, the enlarged lug heads (43) of the lugs (40,42) of the first and second rows (1,2) are substantially aligned with the axially inner end (45) of the adjacent axially outer portion (40B, 42B) of the lugs (40,42). This means that the enlarged lug head (43) of the lugs (40,42) of the first and second row are axially inward of the axially outer location (62) between the lug end (45) axially outer portion (40B,42B) of the lug (42). The lugs (40,42) extend from the inner tread (13) a radial distance (D) of about 1.9 cm or more, preferably about 2.5 cm. This deep non-skid tread (12) is superior in traction in wet or sloppy soil conditions. The channels (60) are arranged such that as the tire (10) rotates and the lugs (40,42) enter the footprint or ground-contacting portion at least two of lugs (40) and two of lugs (42) or three soil discharge channels (60) are engaging the soil on one or both tread halves. The soil or mud is quickly expelled either axially over the shoulder or circumferentially through the channels locations (61,62). Furthermore, the mud cannot pack around these deep lugs (40, 42) due to the unique lug spacing and the circumferential continuous open channels at locations (61,62,63) between the soil discharge channels (60) which actually prevents mud from packing in the tread pattern as the tire (10) rotates.

An important feature of the tread (12) of the current invention of the preferred embodiment tire is the circumferentially extending enlarged lug heads (43). These features enhance the ride of the tire (10) when the ground is firm by insuring that there is a sufficient lug contact with the road to prevent these tall lugs (40,42) from squirming as they enter or leave the tire's footprint or contact patch as the tire rotates. Additionally, as can further be observed from the drawings the lugs (40,42) are arranged such that at least two lugs on the tread are in contact along a one-inch wide axial band at any circumferential location of the tread. That is, if one draws a one inch wide band axially across the tread the band will intersect at least two lugs, preferably the band width is substantially less than one inch.

These features make the driver feel that he has a large amount of tread in contact with the road surface when in fact only a very small percentage of the contact patch is in road contact.

This tread according to the invention has less than 33% of the tread area contacting a paved surface, preferably as shown about 25%.

Unlike farm tires which travel at speeds of less than 25 miles per hour. This ATV tire must be capable of speeds close to 50 mph. At such speeds the lugs must work in concert to prevent harsh vibrations from being created which could cause ride problems. This tread pattern reduces these vibrations to permit the tire to be operated as high speed. This is made possible by the shape and the orientation of the lugs as shown. Each lug (40,42) has a somewhat inclined axially inner portion (40A,42A) as well as a more lateral inclination of the axially outer portion (40B,42B) which enhances the tire's traction performance. As shown the outer portions (40B,42B) each have a narrow slot or groove (70) to further enhance traction. The inner portions (40A,42B) having a narrow axially inner end, which progressively widens toward the enlarged lug head (43). This narrow end between the leading edges (67) and trailing edges (68) is designed to penetrate the soil due to the reduced axial width. Once the end penetrates the soil the leading edge (67) curves to a more lateral inclination giving an increased biting edge. The inclined axially inner portions (40A,42B) provides a tremendous amount of traction improvement, while the axially outer portions (40B,42B) provide additional increased forward traction due to the lateral inclination.

Figure 5:
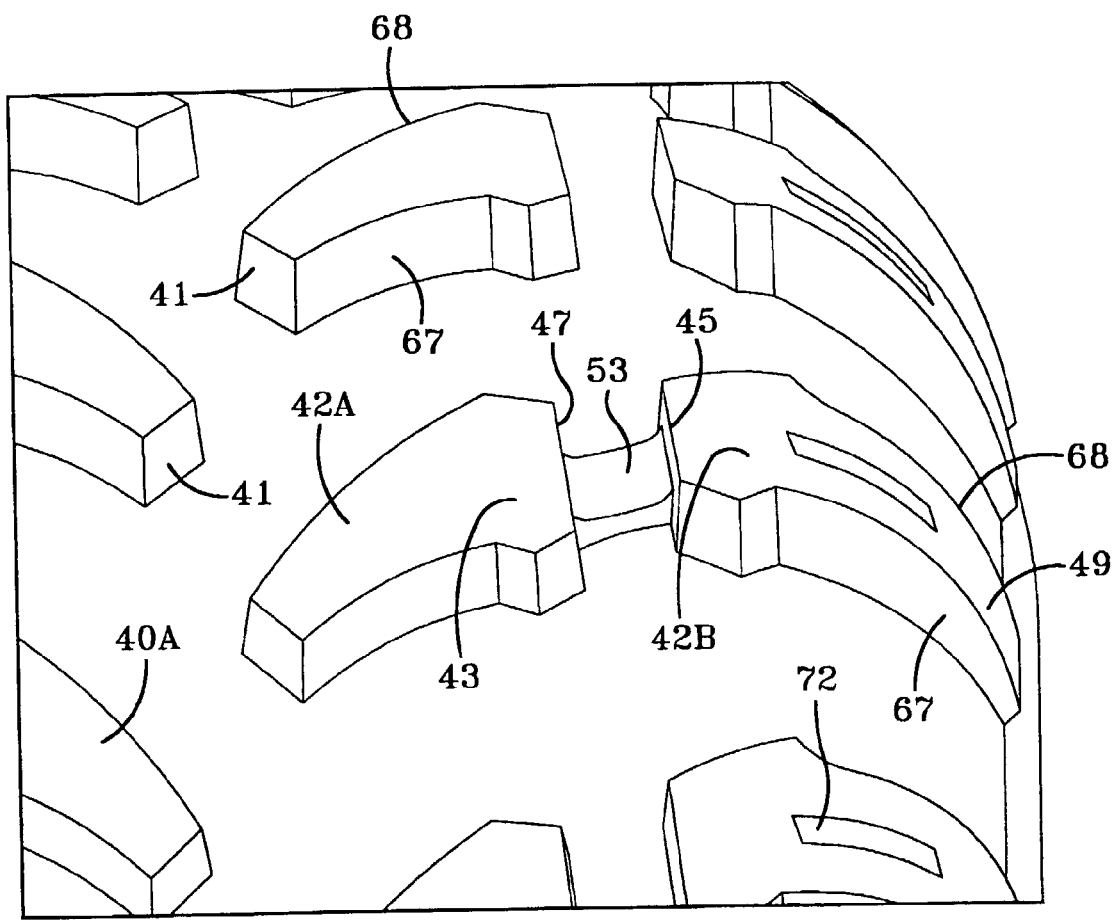
FIG. 5 is an alternative lug and block construction for the tire of FIG. 1.

As further illustrated in FIG. 5, the locations (62) do not have to extend full depth as shown in the preferred embodiment tire of FIGS. 1, 2, 3, 4 and 6. The space between the axially inner portion (40A,42A) and the axially outer portion can be bridged by a tie bar (53) of a reduced depth. It is believed important that this connection (53), between the lug portions, should leave an opening having a depth of at least 50% of the lug depth (D) for the circumferentially continuous open channel soil flow characteristics to be maintained. Lesser amounts of opening are believed to be too restrictive in terms of flow and therefore less desirable.

As is readily apparent the circumferentially continuous open channels as shown in the plan view of FIG. 2, has an opening having a minimum axial width of (S). This minimum opening width is preferably at least 1 cm, more preferably at least 2 cm. Ideally this minimum opening axial width (S) in each lug (40,42) of the first or second row is axially aligned around the circumference of the tire. That is the minimum opening width (S) in each channel can be intersected by a parallel plane (A,B, or C) that is parallel to the centerplane of the tread. This means that the three circumferential channels (61,62,63) need not have the minimum openings axially aligned around the circumference of the tread (12) as shown, but at a minimum these openings should be such that a plane (A,B, or C) would intersect each opening. Ideally the contact patch as measured on a hard surface has the outer channels in the interior of the patch so that at least a portion of the axially outer lug portions (40B,42B) are in the contact patch. As shown these axially outer openings are located within the lateral extremes of the contact patch because if they are positioned too close to the shoulder of the tread, they have almost no assistance in tread cleaning through the channels (61,62,63).

As shown, the opening at location (62) can alternatively be almost of a constant width but in that case the opening should have a minimum axial spacing S of about 1–2 cm or greater to insure that soil can rapidly flow through the opening.

Alternatively at the location (62) the opening of the channel between the axially inner portion (40A,42A) and the axially outer portions (40B,42B) between the circumferential location of the minimum opening width (S) and extending toward the trailing edges (68) preferably diverges. This diverging of the channel in this area between lug portions is believed to help the flow of mud as well as provide a mud releasing feature that help the soil to quickly dislodge from the tread as the tire rolls through the mud.

As the tire rotates in wet clay type soils the channels provide flow paths that push into the soil discharge channels (60). Because the three circumferentially continuous open channels (61,62,63) provide an unobstructed path in the circumferential direction, the mud is thrown out the back of the tire as the footprint clears the ground thus leaving three open circumferential channels (61,62,63). These channels (61,62,63) actually helps clean the mud between the circumferentially adjacent lugs (40,42) by allowing water/moisture to get under the mud and dissolve it from the bottom up as well as from the top down. In very wet conditions the circumferential channels (61,62,63) tend to pump water into the soil discharge channels (60) actually washing the soil out of the channels.

At a minimum the tread as disclosed frees a portion of lugs biting edges under these worst case conditions enabling the tread to continue to provide traction.

What is claimed is:

1. An all-terrain vehicle tire comprising: a carcass, and a tread located radially outward of the carcass, the tread having a plurality of elongated lugs, each lug having an axially inner end and an axially outer end, the lugs extending radially outwardly from an inner tread, and being located between first and second lateral tread edges, the distance between the lateral tread edges defining the tread arc width, the distance halfway defining the centerplane (EP) of the tread, the elongated lugs being arranged in rows around the circumference of the tread, a first row of elongated lugs extending from the lug axially inner end adjacent the centerplane (EP) of the tread toward the first lateral edge terminating at the lug axially outer end, a second row of elongated tread lugs extending from the lug axially inner end adjacent the centerplane (EP) of the tread toward the second lateral tread edge terminating at the lug axially outer end the tread having a footprint with three or more circumferentially continuous a straight opening having a minimum axial width of 10 mm, the three or more open channels including a first circumferentially continuous open channel being located between the axially inner ends of the first and second rows of elongated lugs and on the centerplane of the tread a second circumferentially continuous open channel being located between the first lateral tread edge and the centerplane (EP) of the tread, and passing through each elongated lug forming a lug axially inner portion and a lug axially outer portion, a third circumferentially continuous channel being located between the second lateral tread edge and the centerplane (EP) of the tread and passing through each elongated lug forming a lug axially inner portion and a lug axially outer portion, the elongated tread lugs have a radial depth D as measured from a radially outer surface to the inner tread of the tread, and a reduced depth tire bar connecting the lug axially inner portion to the lug axially outer portion, the reduced depth tie bar having a height (h), (h) being 50% or less of D, and wherein the tread has a net-to-gross ratio of about 35% or less, as measured between the lateral edges around the entire circumference of the tread.

2. The all-terrain vehicle tire of claim 1 wherein the second and the third circumferentially continuous open channels are located at distance less than 40% of the tread arc width (TW) from the centerplane.

3. The all-terrain vehicle tire of claim 2 wherein the second and third circumferentially continuous channels are located in the range of less than 40% to greater than 25% of the tread arc width from the centerplane (EP) of the tread.

4. The all-terrain vehicle tire of claim 1 wherein the second and the third circumferentially continuous open channels are located at about 33% of the tread arc width (TW) from the centerplane (EP) of the tread.

* * * * *